United States Patent [19]

Obermeyer

[11] Patent Number: 5,263,060
[45] Date of Patent: Nov. 16, 1993

[54] SEGMENTED INSTRUMENTATION TUBE INCLUDING A LOCKING SLEEVE FOR INTERLOCKING THE SEGMENTS OF THE INSTRUMENTATION TUBE

[75] Inventor: Franklin D. Obermeyer, Pensacola, Fla.

[73] Assignee: Westinghouse Electric Corp., Pittsburgh, Pa.

[21] Appl. No.: 853,566

[22] Filed: Mar. 18, 1992

[51] Int. Cl.$^5$ ............................................. G21C 17/00
[52] U.S. Cl. ................................... 376/254; 376/240; 376/245
[58] Field of Search ........................ 376/254, 240, 245

[56] References Cited

U.S. PATENT DOCUMENTS

| | | | |
|---|---|---|---|
| 4,778,647 | 10/1988 | Gasparro | 376/347 |
| 4,897,239 | 1/1990 | Planchard et al. | 376/254 |
| 5,078,956 | 1/1992 | Lunz | 376/254 |
| 5,078,957 | 1/1992 | Tower et al. | 376/254 |

Primary Examiner—Donald P. Walsh
Assistant Examiner—Frederick H. Voss
Attorney, Agent, or Firm—Walter S. Stevens

[57] ABSTRACT

Segmented instrumentation tube including a locking sleeve for interlocking the segments of the instrumentation tube, so that the threaded ends of the instrumentation tube do not unthread when subjected to vibration, such an instrumentation tube being suitable for use in a nuclear reactor pressure vessel. The instrumentation tube has a first member having a threaded end portion that has a plurality of first holes circumferentially around the outside surface thereof. The instrumentation tube also has a second member having a threaded end portion that has a plurality of second holes circumferentially around the outside surface thereof. The threads of the second member are caused to threadably engage the threads of the first member for defining a threaded joint therebetween. A sleeve having an inside surface surrounds the end portion of the first member and the end portion of the second member and thus surrounds the threaded joint. The sleeve includes a plurality of first projections and second projections that outwardly extend from the inside surface to engage the first holes and the second holes, respectively. The outside surface of the sleeve is crimped or swaged at the locations of the first projections and second projections such that the first projections and the second projections engage their respective holes. In this manner, independent rotation of the first member with respect to the second member is prevented, so that the instrumentation tube will not unthread at its threaded joint.

16 Claims, 7 Drawing Sheets

FIG.I.

SEGMENTED INSTRUMENTATION TUBE INCLUDING A LOCKING SLEEVE FOR INTERLOCKING THE SEGMENTS OF THE INSTRUMENTATION TUBE

This invention was conceived in the course of, or under Contract Number DE-AC03-86-SF18495 between Westinghouse Electric Corporation and the United States Government, acting through the Department of Energy. The Government may have rights in this patent application and any patent issuing thereon.

BACKGROUND OF THE INVENTION

This invention generally relates to locking apparatus and more particularly relates to a segmented instrumentation tube including a locking sleeve for interlocking the segments of the instrumentation tube, so that the threaded ends of the instrumentation tube do not unthread when subjected to vibration, such an instrumentation tube being suitable for use in a nuclear power reactor pressure vessel.

Before discussing the current state of the art, it is instructive first to briefly describe the structure and operation of a typical nuclear power reactor, which contains instrumentation tubes. In this regard, a nuclear power reactor is a device for producing heat by the controlled fission of fissile material. The fissile material is in the form of fuel pellets disposed in an elongated hollow rod which serves as cladding for the fuel pellets. A plurality of the elongated fuel rods are bundled together by a plurality of spaced-apart grids having open cells therein for receiving each fuel rod therethrough. Moreover, a plurality of elongated movable control rods slidably extend through preselected ones of the grid cells for controlling the fission process. A plurality of these fuel rod assemblies are grouped to define a nuclear reactor core, which is sealingly enclosed within a reactor pressure vessel. Liquid moderator coolant (i.e., demineralized water) is caused to flow past the rods of the fuel assembly for assisting in the fission process and for removing the heat produced by the fission process. During operation of the nuclear reactor, heat due to fission of the fuel material is carried from the fuel assemblies by the liquid moderator coolant flowing past the fuel rods in the fuel assemblies. The heat carried away by the liquid moderator coolant is ultimately transferred to a turbine-generator for generating electricity in a manner well known in the art of electrical power generation.

Each of the previously mentioned movable control rods is engaged by a control rod drive shaft capable of moving the control rod slidably through its associated grid. Each control rod drive shaft extends through an upper core plate and through an upper support plate that is spaced above the upper core plate, the upper support plate and the upper core plate being horizontally disposed in the reactor pressure vessel. The control rods that are engaged by the control rod drive shaft are slidably received in elongated thimble tubes disposed through the grid cells of each fuel assembly, which fuel assembly is in turn located below the upper core plate. Moreover, vertically extending through the upper support plate and the upper core plate are a plurality of elongated instrumentation tubes each having a longitudinal bore therethrough for receiving a probe carrier that caries an instrumentation probe to measure desired core physics quantities (e.g., neutron flux) in the reactor core.

Each instrumentation tube includes elongated portions having threaded ends to threadably connect the elongated portions of the instrumentation tube together. The instrumentation tube is segmented for ease of assembly when positioning it within the reactor pressure vessel. However, during normal operation of the reactor, the liquid moderator coolant circulating in the reactor pressure vessel causes vibration of the internal components, including the instrumentation tubes, which are disposed in the vessel. Moreover, off-normal operation caused by seismic events and postulated accidents (e.g., loss-of-coolant accident) also causes vibration of the internal components, including the instrumentation tubes. It is desirable to prevent any possibility of unthreading of the threaded ends of the instrumentation tubes during normal and off-normal conditions because such unthreading, that may be caused by these vibrations, may lead to the elongated portions of the instrumentation tube becoming disconnected at their threaded ends. Disconnection of the elongated portions of the instrumentation tube is undesirable because such disconnection may lessen the ability of the instrumentation tube to provide a clear and straight guideway for the probe carrier.

Therefore, a problem in the art has been to provide means for preventing unthreading of the threaded ends of the instrumentation tube when the instrumentation tube is subjected to vibrations caused by normal operating conditions and when the instrumentation tube is subjected to vibrations caused by off-normal operating conditions.

One prior art solution to this problem is to place weldments around the outside of the threaded ends belonging to the elongated portions of the instrumentation tube to provide additional assurance that the threaded ends will not unthread. However, the placement of such weldments is time consuming and hence costly. Moreover, during maintenance operations, disassembly of the instrumentation tube by unthreading the threaded end is made more difficult by the presence of the welds. Therefore, it is desirable to provide a means for preventing unthreading of the threaded ends of elongated portions of the instrumentation tube in a manner that does not require welding.

Apparatus for connecting the threaded ends of members together in a manner not necessarily requiring welding are known in the prior art. For example, an improved conduit and means for supporting the same is disclosed in U.S. Pat. No. 1,438,751 entitled "Conduit for Thermotemperature Circuits of Grain Tanks" issued Dec. 12, 1922 to Leonard H. Des Isles. This patent discloses a conduit formed of a plurality of pipe sections connected together by couplings. The exterior of adjacent ends of the pipe sections are formed respectively with right and left hand screw threads and the interior of the coupling is formed with corresponding right and left hand threads. The adjacent ends of the pipe sections are shaped so that when brought together they will interlock. When the pipe sections are joined together, their threaded ends are advanced within the coupling until they engage the correspondingly threaded portions of the coupling, after which, by turning the coupling, the ends of the pipe sections will be brought together until they interlock. According to this patent, when the pipe sections are joined together by the coupling, danger of the independent rotation of the sections is avoided and hence the loosening or disconnection of the sections is prevented. After the coupling is in position for use, the extreme ends of the coupling are upset or swaged so that these parts bear securely against the walls of the pipe sections. Although the Des Isles patent discloses a coupling that is swaged to join pipe sections, this patent does not appear to disclose a segmented instrumentation tube including a locking sleeve for interlocking the segments of the instrumentation tube, so that the threaded ends of the instrumentation tube do not unthread when subjected to vibration.

A joint effected between a section of pipe and a tubular coupling is disclosed in U.S. Pat. No. 2,001,204 entitled "Pipe Joint and Method of Making the Same" issued May 14, 1935 to James A. Long et al. This patent discloses a pipe and tubular coupling machined exteriorly and interiorly, respectively, to provide exact sizes for a shrink-fit or press-fit. The coupling is beveled at its ends. The pipe section is formed with an annular groove at a distance from the end thereof. The parts are assembled together with the beveled end of the coupling disposed opposite to the annular groove of the pipe section. In order to obtain press-fitting engagement between the pipe section and the coupling, the latter element is preferably shrunk upon the former element. After the parts have thus been assembled, a swaging operation is performed at the beveled end of the coupling to produce an inwardly directed annular boss which interlocks with the groove in the pipe section and forms therewith a fluid tight seal. Although the Long et al. patent discloses a pipe section and a coupling that are swaged together, this patent does not appear to disclose a segmented instrumentation tube including a locking sleeve for interlocking the segments of the instrumentation tube, so that the threaded ends of the instrumentation tube do not unthread when subjected to vibration.

Although the above-recited prior art disclose an instrumentation tube including elongated portions having threaded ends welded together, a conduit formed of pipe sections connected together by couplings, and apparatus for effecting a joint between a pipe section and a coupling, the above-recited prior art do not appear to disclose a segmented instrumentation tube including a locking sleeve for interlocking the segments of the instrumentation tube, so that the threaded ends of the instrumentation tube do not unthread when subjected to vibration.

Therefore, what is needed is a segmented instrumentation tube including a locking sleeve for interlocking the segments of the instrumentation tube, so that the threaded ends of the instrumentation tube do not unthread when subjected to vibration.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

SUMMARY OF THE INVENTION

Figure 1:
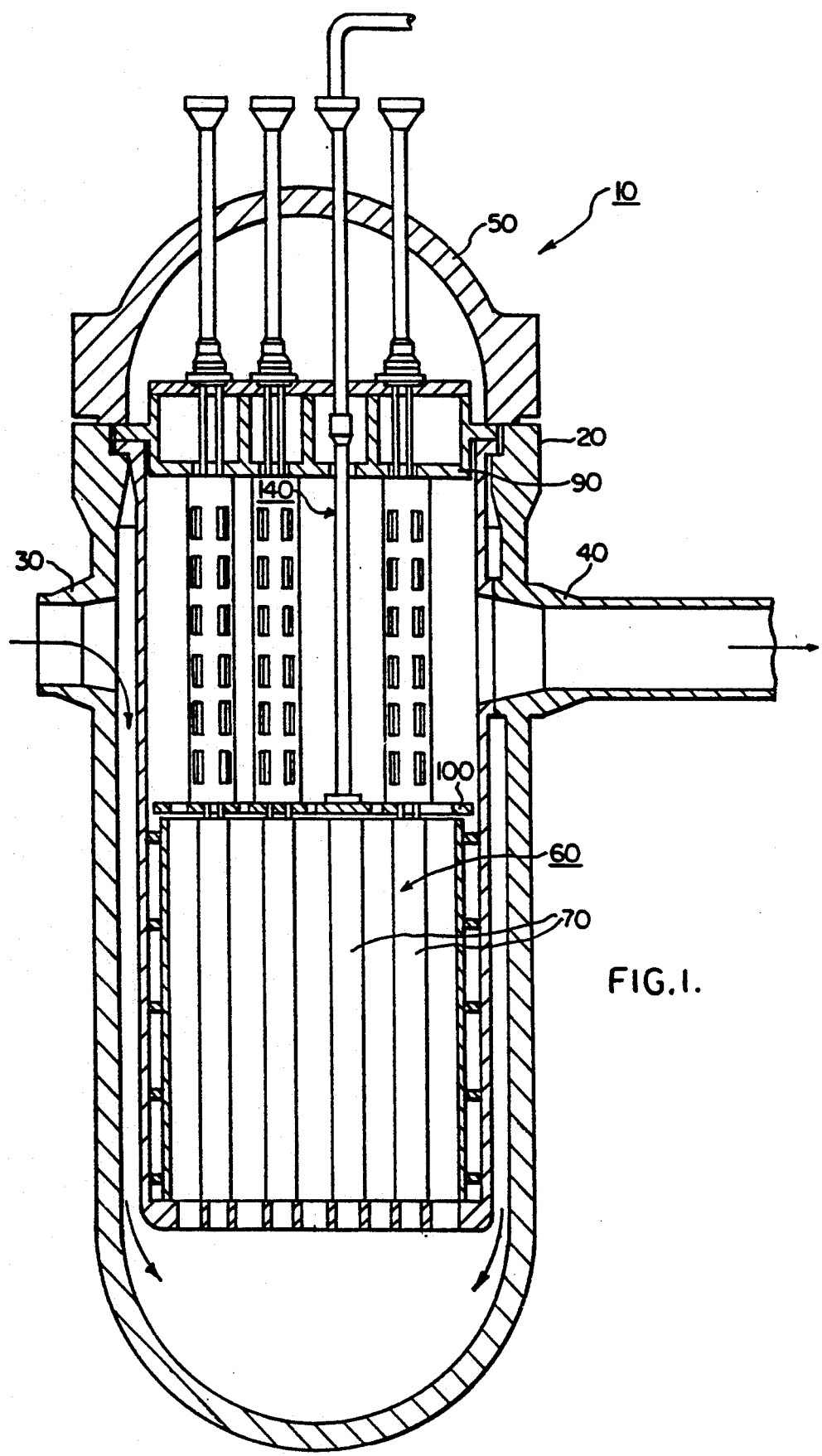
FIG. 1 shows in partial vertical section, a typical nuclear reactor pressure vessel with parts removed for clarity, the pressure vessel having a hollow support column disposed therein, the support column partially enclosing a segmented instrumentation tube belonging to the invention.

Disclosed herein is a segmented instrumentation tube, suitable for use in a nuclear power reactor pressure vessel, the instrumentation tube including a locking sleeve for interlocking the segments of the instrumentation tube, so that the threaded ends of the segments do not unthread when subjected to vibration caused by normal and off-normal operation of the nuclear reactor.

More specifically, the instrumentation tube has a first member having an internally threaded end portion that has a plurality of first holes aligned circumferentially around the outside surface thereof. The instrumentation tube also has a second member having an internally threaded end portion that has a plurality of second holes aligned circumferentially around the outside surface thereof. The internal threads of the second member are caused to threadably engage the external threads of the first member for defining a threaded joint therebetween. A sleeve having an inside surface surrounds the end portion of the first member and the end portion of the second member and thus surrounds the threaded joint. The sleeve includes a plurality of first projections and second projections that outwardly extend from the inside surface of the sleeve to engage the first holes and the second holes, respectively. The outside surface of the sleeve is then crimped or swaged at the locations of the first projections and second projections such that the first projections and the second projections engage their respective holes. In this manner, independent rotation of the first member with respect to the second member is prevented, so that the instrumentation tube will not unthread at its threaded joint when subjected to vibration.

An object of the present invention is to provide a segmented instrumentation tube having a substantially straight and unobstructed guideway for guiding an instrumentation probe therethrough, such that the instrumentation tube will continue to provide a straight and unobstructed guideway for the probe even when subjected to vibrations caused by normal and off-normal operation of the nuclear reactor.

A feature of the present invention is the provision of a segmented instrumentation tube having segments with threaded ends and a locking sleeve for interlocking the threaded ends of the segments.

An advantage of the present invention is that the locking sleeve obviates the need for time-consuming welding of the threaded joint defined by the threaded ends of the segments belonging to the instrumentation tube.

Another advantage of the present invention is that the locking sleeve prevents independent rotation of the segments, so that the threaded ends of the segments remain threadably engaged even when subjected to vibration.

DESCRIPTION OF THE PREFERRED EMBODIMENTS

Nuclear reactor pressure vessels contain internal components having threaded ends. Such instrumentation tubes comprise elongated segments having threaded ends for threadably connecting the segments of the instrumentation tube together. However, during normal operation of the reactor, the liquid coolant circulating in the pressure vessel causes vibration of the internal components, including the instrumentation tubes. Moreover, off-normal operation caused by seismic events and postulated accidents (e.g., loss-of-coolant accident) also causes vibration of the internal components, including the instrumentation tubes. It is desirable to prevent unthreading of the threaded ends of the instrumentation tube during normal and off-normal operating conditions because such unthreading, that may be cause by these conditions, may lead to the elongated segments of the instrumentation tube becoming disconnected at their threaded ends. Disconnection of the elongated segments of the instrumentation tube may lessen the ability of the instrumentation tube to provide a clear guideway for the instrumentation probe. Therefore, disclosed herein is an improved segmented instrumentation tube including a locking sleeve for interlocking the segments of the instrumentation tube, so that the threaded ends of the instrumentation tube will not unthread when subjected to vibration that may be caused by normal and off-normal operation of the nuclear reactor.

However, before describing the subject matter of the present invention, it is instructive first to briefly describe the structure and operation of a typical nuclear reactor.

Figure 2:
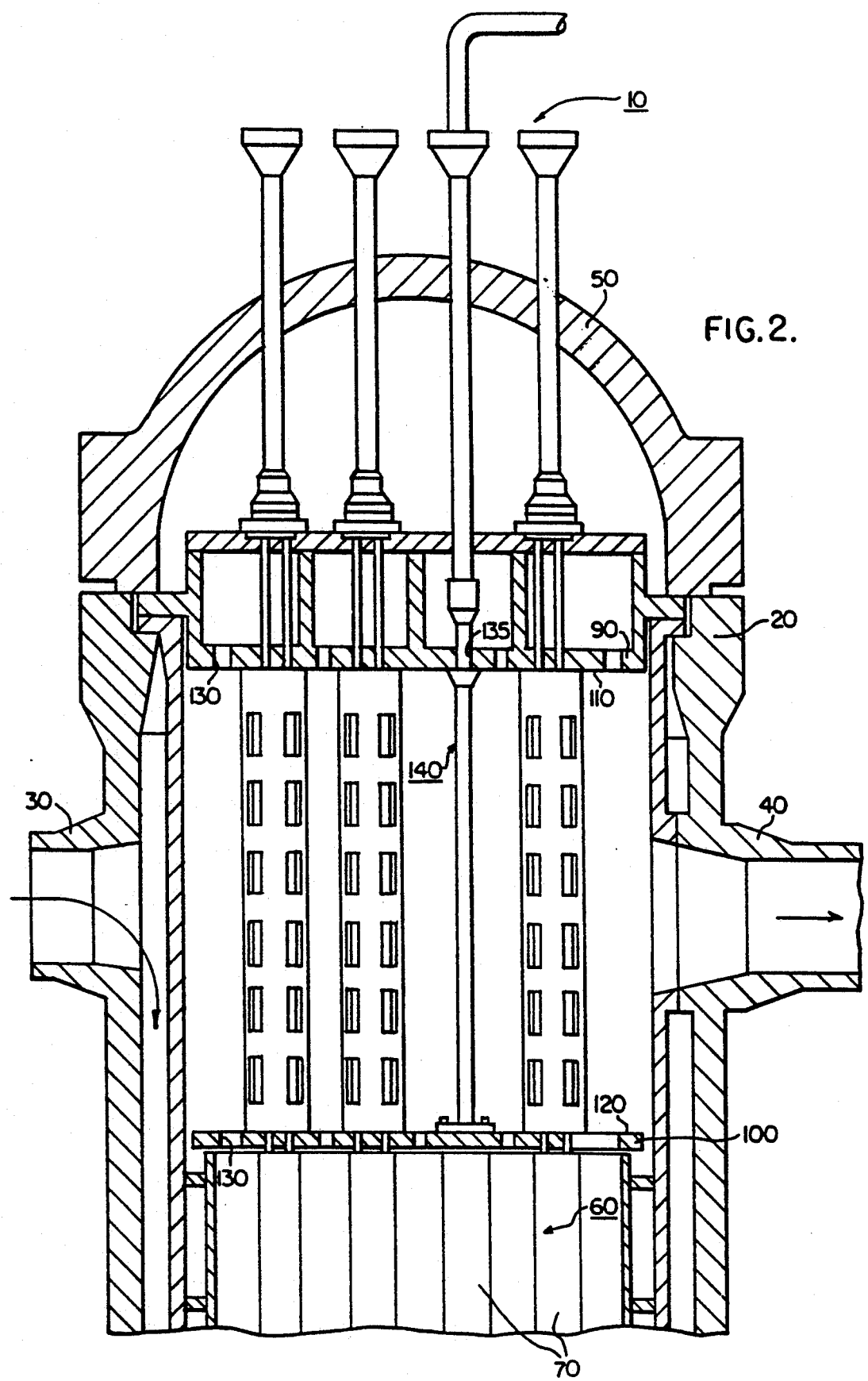
FIG. 2 shows in partial vertical section, the upper internal structure of the pressure vessel, the upper internal structure including upper internal components, such as a support column interposed between an upper support plate and an upper core plate.

Therefore, referring to FIGS. 1 and 2, there is shown a typical nuclear power reactor, generally referred to as 10, for producing heat by the controlled fission of fissile nuclear fuel material (not shown). Reactor 10 includes a vertically-oriented reactor pressure vessel 20 open at its top end and having a plurality of inlet nozzles 30 and outlet nozzles 40 attached to the upper portion thereof (only one of each nozzle is shown). A hemispherical closure head 50 is mounted atop vessel shell 20 and is sealingly attached, which may be by bolting, to the open top end of vessel shell 20, so that closure head 50 sealingly caps vessel shell 20. Capping vessel shell 20 in this manner allows for suitable pressurization of the coolant within vessel shell 20 as reactor 10 operates.

Still referring to FIGS. 1 and 2, disposed in reactor 10 is a nuclear reactor core, generally referred to as 60, containing the nuclear fuel disposed in a plurality of fuel assemblies 70. A control rod drive shaft (not shown) extends trough each of a plurality of thermal sleeves 80, each drive shaft engaging a plurality of movable control rods (not shown) for controlling the fission process in fuel assemblies 70 in a manner well known in the art of nuclear power production. Disposed inwardly of vessel shell 20 is a horizontal upper support plate 90 that transmits loads from the core and other internal components to the pressure vessel wall and a horizontal upper core plate 100 that supports and locates the top of the fuel assemblies 70, which upper core plate 100 is spaced below upper support plate 90. Upper support plate 90 has a bottom surface 110 and upper core plate 100 has a top surface 120 thereon. Moreover, upper support plate 90 and upper core plate 100 each has a multiplicity of coolant flow orifices 130 for flow of liquid moderator coolant (i.e., demineralized water) therethrough, which coolant removes the heat produced by fission of the fissile fuel material contained in fuel assemblies 70 and which also assists the fission process. Upper support plate 90 also has a plurality of internally threaded apertures 135 for reasons provided hereinbelow.

During operation of nuclear reactor 10, the liquid moderator coolant enters inlet nozzle 30 and circulates through reactor core 60 and through orifices 130 in upper support plate 90 and upper core plate 100. The coolant that circulates within vessel shell 20 eventually exits vessel shell 20 through exit nozzle 40, whereupon it is piped to a heat exchange device (not shown) for generating steam. The steam is then piped from the heat exchange device to a turbine-generator (not shown) for producing electricity in a manner well known in the art of nuclear powered electricity production. The coolant mass flow rate in vessel shell 20 during normal operation may be relatively high, such as approximately 40,000 pounds mass per second. The coolant mass flow rate in vessel shell 20 during off-normal operation will cause even higher flow rates. Such relatively high mass flow rates necessarily cause vibration of the reactor internal components.

Referring to FIGS. 2, 3, 4, and 5, there is shown the subject matter of the present invention, which is a segmented instrumentation tube, generally referred to as 140, for guiding an instrumentation probe (not shown) therethrough. Segmented instrumentation tube 140 comprises an elongate generally cylindrical and tubular first member, such as first segment 150, having an inside surface 160 and having an internally threaded distal end portion 170 having internal threads 175. First segment 150 also has a proximal end portion 180 having external threads and sized to be received in a respective one of the internally threaded apertures 135. The term "proximal end" is defined to mean that end of the segment that is closer to the bottom of vessel shell 20 and the term "distal end" is defined to mean that end of the segment that is further away from the bottom of vessel shell 20 (i.e., closer to the top of vessel shell 20). Moreover, first segment 150 has an outside surface 190 having a plurality of spaced-apart circular blind first holes 200 defining a rear wall 210 in each of first holes 200. It will be appreciated that each first hole 200 also has a center and a predetermined diameter for reasons provided hereinbelow. In the preferred embodiment, the plurality of first holes 200 are aligned circumferentially around distal end portion 170 of first segment 150.

Still referring to FIGS. 2, 3, 4, and 5, instrumentation tube 140 further comprises an elongate generally cylindrical and tubular second member, such as second segment 220, coaxially aligned with first segment 150. Second segment 220 has a funnel-shaped distal end portion 225 for easily slidably receiving the instrumentation probe carrier and an externally threaded proximal end portion 230 having external threads 235. The external threads 235 of proximal end portion 230 of second segment 220 threadably engage the internal threads 175 of distal end portion 180 of first segment 150 for defining a threaded joint therebetween. Second segment 220 has an outside surface 240 having a plurality of spaced-apart circular blind second holes 250 defining a rear wall 260 in each of second holes 250. It will be appreciated that each second hole 250 has a center and a predetermined diameter for reasons provided hereinbelow. In the preferred embodiment, the plurality of second holes 250 are aligned circumferentially around proximal end portion 230 of second segment 220. Moreover, for reasons provided hereinbelow, each of second holes 250 is coaxially aligned with respective ones of first holes 200 for defining a predetermined distance between the centers thereof.

Referring yet again to FIGS. 2, 3, 4, and 5, a generally cylindrical member, such as first sleeve 270, having an inside surface 280 longitudinally therethrough surrounds distal end portion 170 of first segment 150 and proximal end portion 230 of second segment 220 for locking distal end portion 170 to proximal end portion 230. In this regard, a plurality of outwardly extending first projections 290 are integrally attached to inside surface 280 of first sleeve 270 for engaging respective ones of first holes 200 in distal end portion 170 of first segment 150. Moreover, a plurality of outwardly extending second projections 300 are integrally attached to inside surface 280 of first sleeve 270 for engaging respective ones of second holes 250 in proximal end portion 230 of second segment 220. For reasons disclosed hereinbelow, first sleeve 270 is preferably thin-walled (i.e., a relatively small wall thickness) and made of a ductile material, such as austenitic stainless steel. It is important that first sleeve 270 be thin-walled and ductile so that first sleeve 270 can be suitably deformed when crimped or swaged around the threaded joint defined by distal end portion 170 of first segment 150 and proximal end portion 230 of second segment 220.

Figure 5:
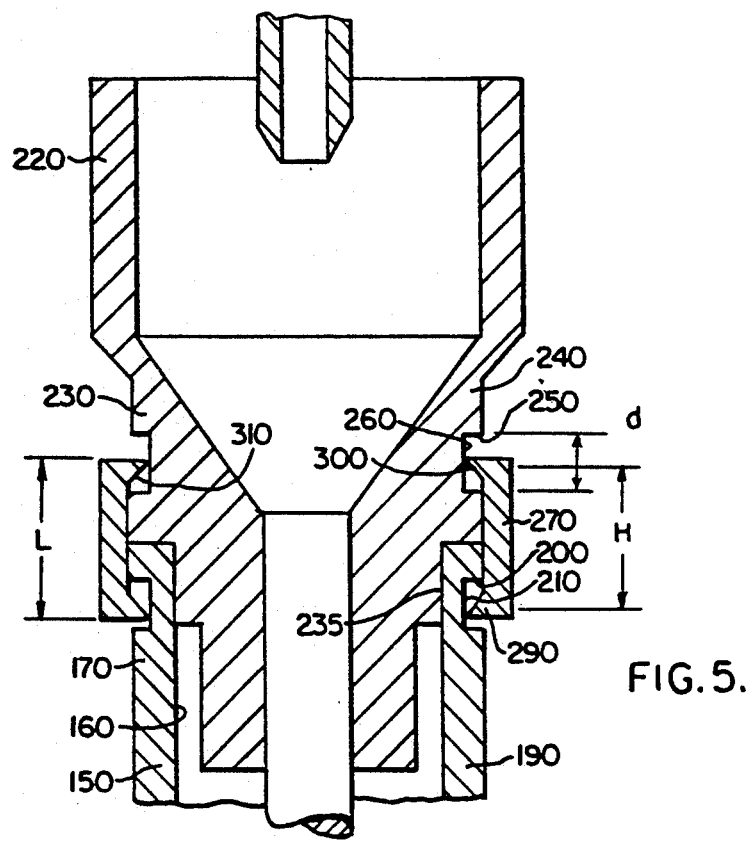
FIG. 5 shows in partial vertical section, the upper segments of the instrumentation tube interlocked by the sleeve.

As illustrated in FIG. 5, first sleeve 270 preferably has an axial length that is longer than the predetermined axial distance defined between the centers of first holes 200 and second holes 250 for assuring that first sleeve 270 will not move axially after swaging. Moreover, the predetermined axial distance between the centers of first holes 200 and second holes 250 is such that first holes 200 and second holes 250 are each partially exposed at each end of first sleeve 270. It is important that holes 200/270 be partially exposed so that an operator may visually precisely determine where the swaging deformation of first sleeve 270 should occur. In other words, first sleeve 270 has a predetermined length approximately equal to the sum of the distance defined between respective ones of first holes 200 and second holes 250 plus about one-half the diameter of the holes so that a portion of each of first holes 250 and second holes 200 is visible as first sleeve 270 surrounds distal end portion 170 of first segment 150 and proximal end portion 230 of second segment 220. This distance is specially designated by the letter "H" in FIG. 5. Each of first projections 290 and second projections 300 has a beveled surface 310 facing or opposite its respective rear wall 210/260 for engaging rear wall 210/260 when first sleeve 270 is swaged or crimped onto distal end portion 170 of first segment 150 and swaged or crimped onto proximal end portion 230 of second segment 220.

Figure 3:
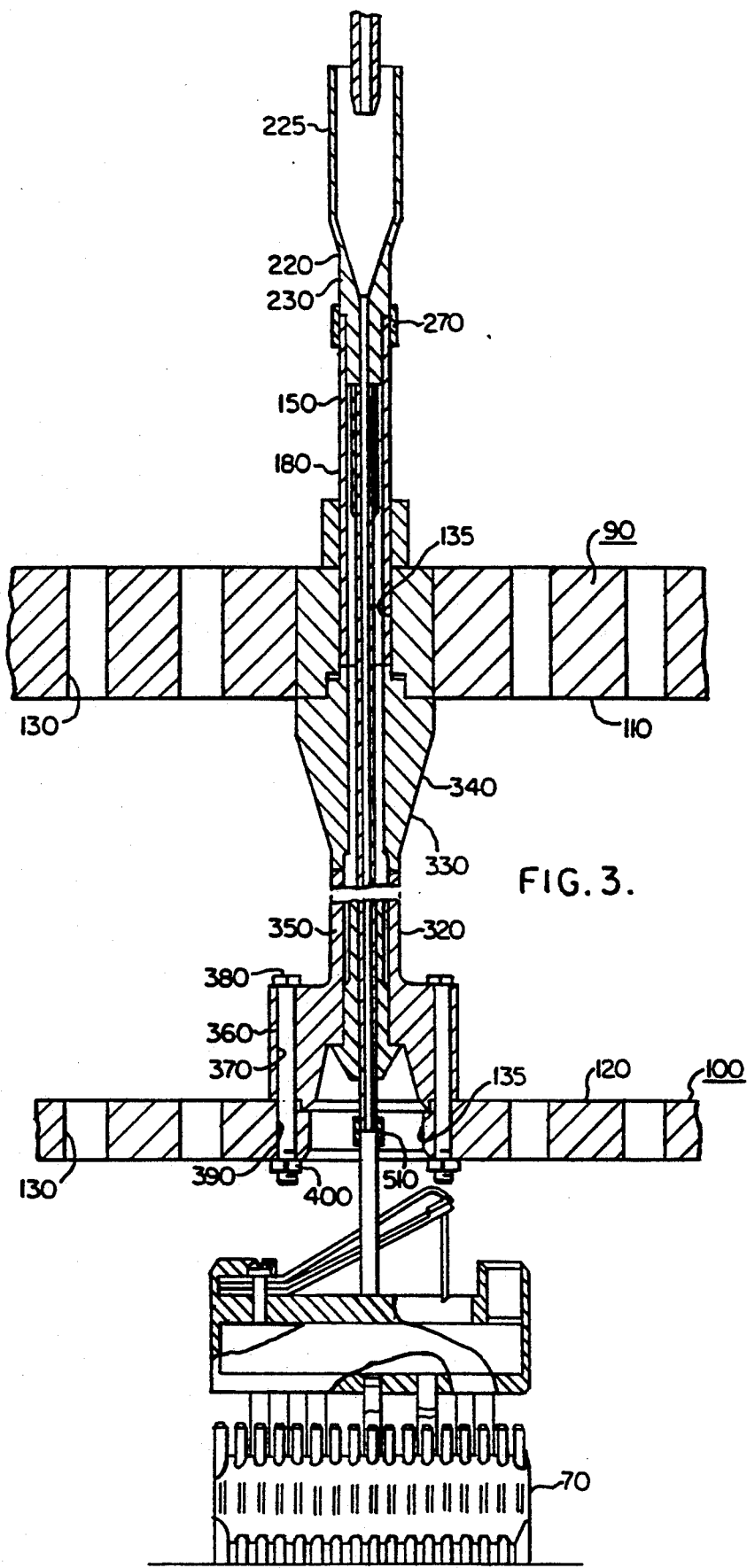
FIG. 3 illustrates in partial vertical section, the instrumentation tube having a portion thereof disposed in the support column.
Figure 4:
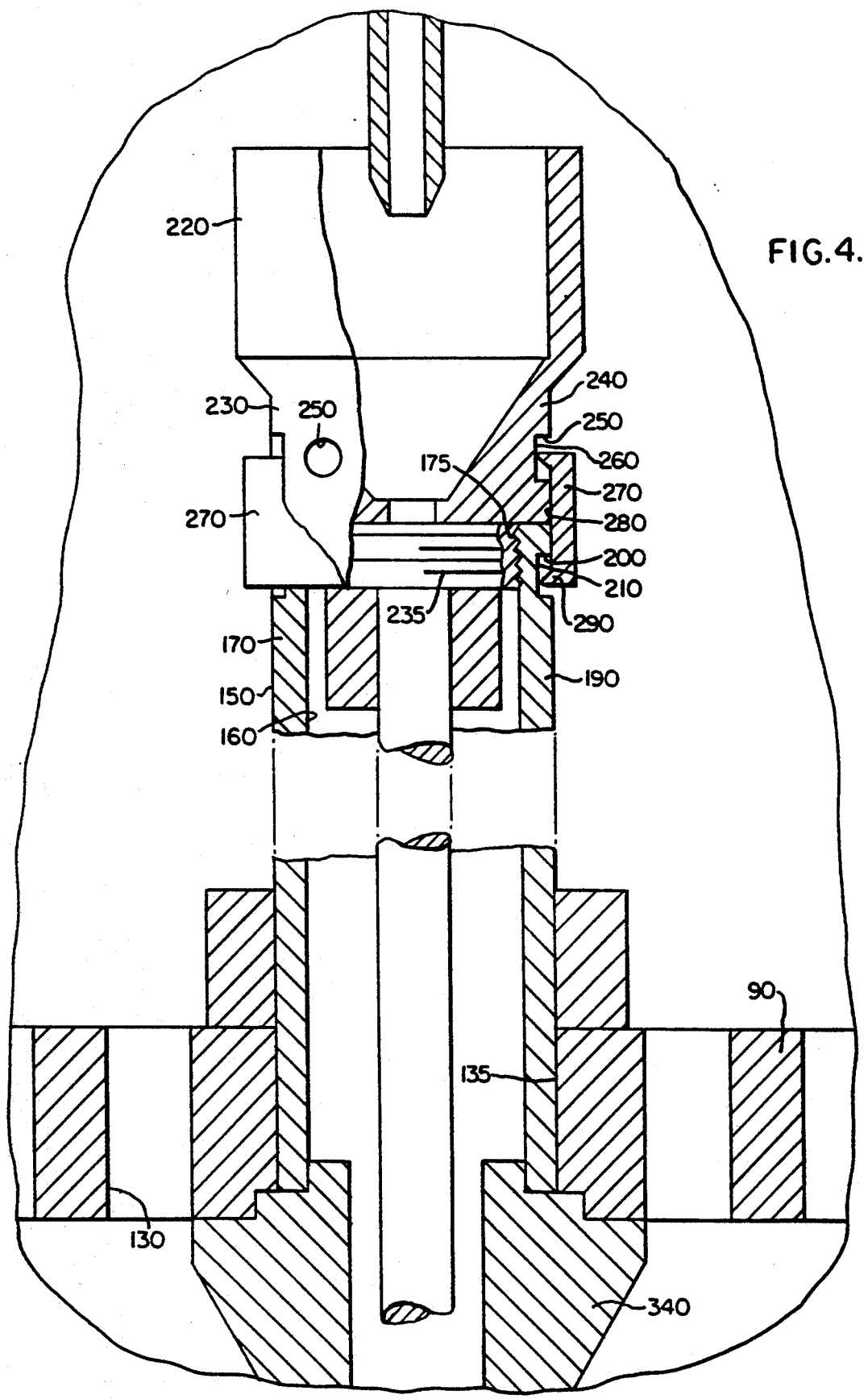
FIG. 4 shows a fragmentation view, in partial vertical section, of the instrumentation tube having upper section, of the instrumentation tube having upper segments thereof interlocked by a locking sleeve and an end thereof connected to the upper support plate.

As best seen in FIG. 3, a portion of segmented instrumentation tube 140 is surrounded by an elongate generally cylindrical and tubular post 320 coaxially aligned with second segment 220. Post 320 has a first end portion 330 having an integrally attached flange 340 therearound for intimately abutting bottom surface 110 of upper support plate 90 to support upper support plate 90. Proximal end portion 180 of first segment 150 is threadably received in aperture 135 and coaxially mounted on the top of post 320 so that first segment 150 is vertically supported by post 320 and laterally supported by aperture 135 of upper support plate 90. Post 320 also has a second end portion 350 having a plurality of integrally attached outwardly extending feet 360 depending from post 320 for resting post 320 on top surface 120 of upper core plate 100. Each of the feet 360 has a bore 370 therethrough for receiving an elongate fastener 380 capable of being received through a respective one of a plurality of holes 390 formed through upper core plate 100. Each fastener has a threaded end extending downwardly beyond hole 390. The threaded end of fastener 380 that extends beyond hole 390 is suitably threadably engaged by a nut 400 for fastening each foot 360 to upper core plate 100, so that post 320 is in turn fastened to top surface 120 of upper core plate 100.

Figure 7:
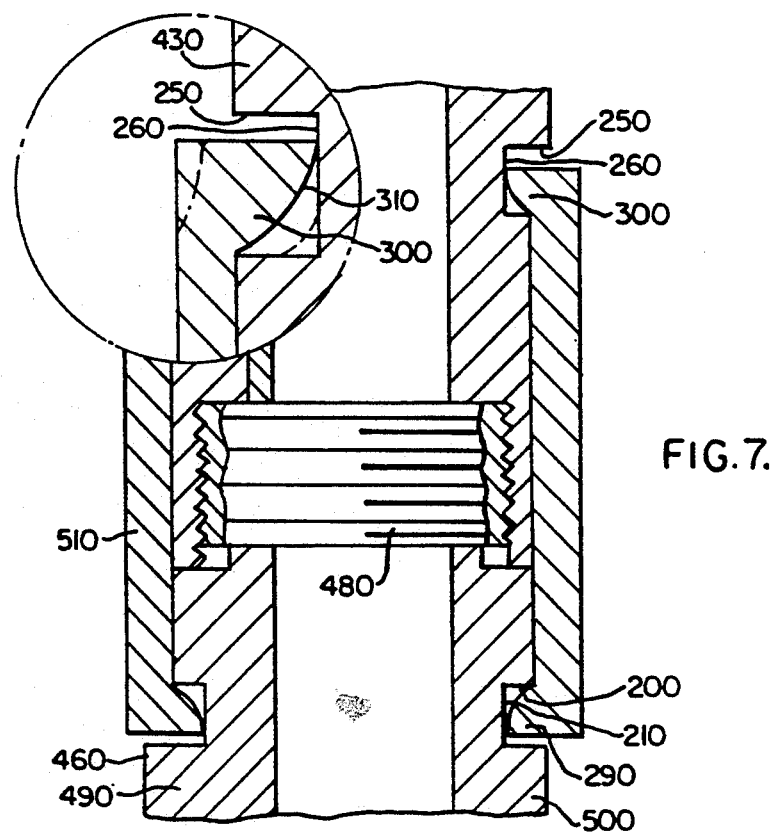
FIG. 7 is a fragmentation view in partial vertical section of the sleeve interlocking the lower segments of the instrumentation tube.
Figure 6:
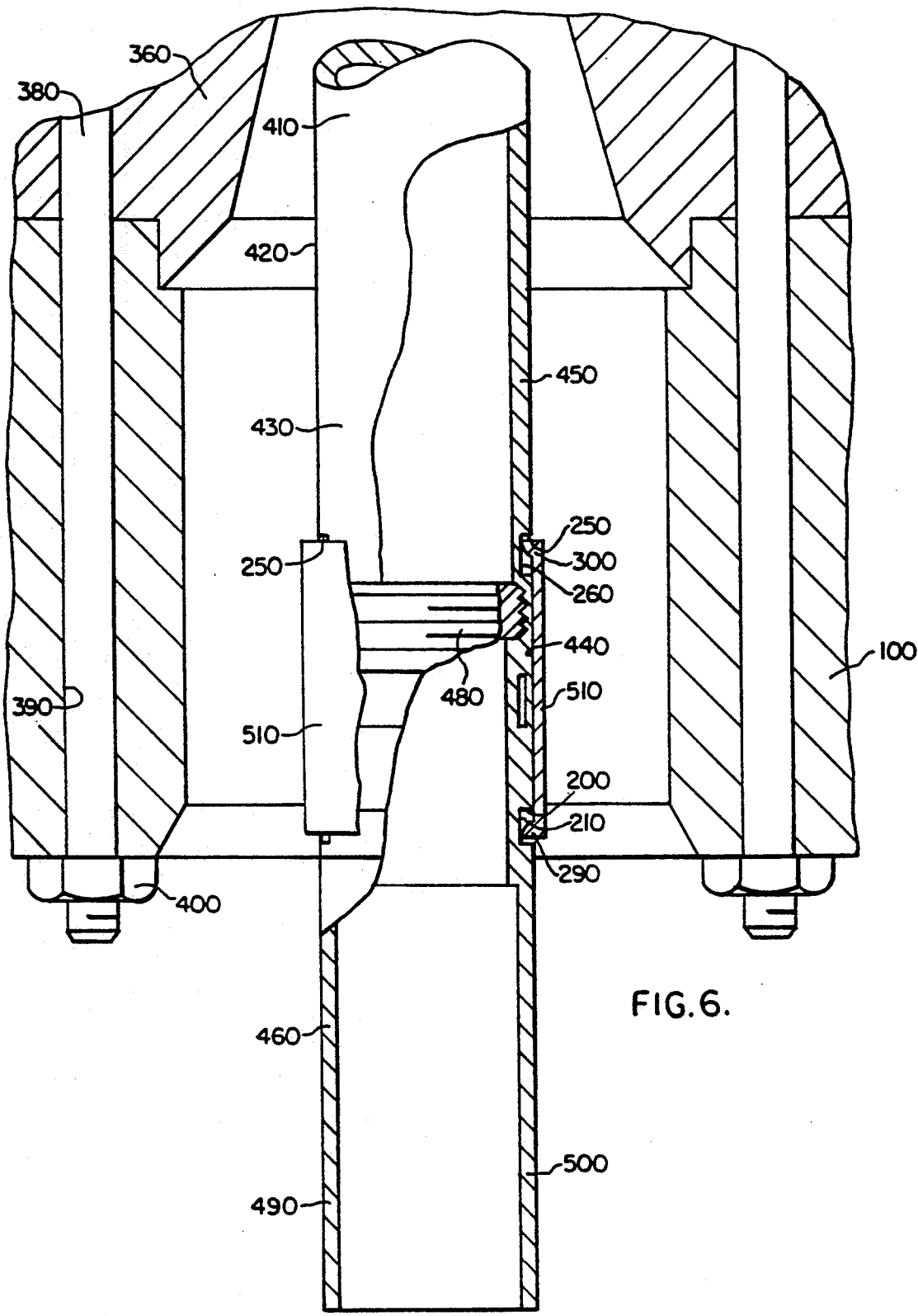
FIG. 6 shows in partial vertical section, the lower segments of the instrumentation tube interlocked by the sleeve.

Referring to FIGS. 6 and 7, instrumentation tube 140 also comprises an elongate generally cylindrical and tubular third segment 410, having a distal end portion 420 which in turn has proximal end portion 230 of second segment 220 coaxially mounted thereon. Third segment 410 also has an internally threaded proximal end portion 430 having internal threads 440. Moreover, third segment 410 has an outside surface 450 having the previously mentioned plurality of spaced-apart circular blind first holes 250 defining a rear wall 210 in each of first holes 200. It will be appreciated that each first hole 200 also has a center and a predetermined diameter for reasons provided hereinbelow. In the preferred embodiment, the plurality of first holes 200 are aligned circumferentially around distal end portion 170 of third segment 410.

Still referring to FIGS. 6 and 7, instrumentation tube 140 also comprises an elongate generally cylindrical tubular fourth segment 460, coaxially aligned with third segment 410. Fourth segment 460 has an externally threaded distal end portion 470 having external threads 480 and also has a proximal end portion 490. The external threads 480 of distal end portion 470 of fourth segment 460 threadably engage the internal threads 440 of proximal end portion 430 of third segment 410 for defining a threaded joint therebetween. Fourth segment 460 has an outside surface 500 having the previously mentioned plurality of spaced-apart circular blind second holes 200 defining a rear wall 260 in each of second holes 200. It will be appreciated that each second hole 200 has a center and a predetermined diameter for reasons provided hereinbelow. In the preferred embodiment, the plurality of second holes 200 are aligned circumferentially around distal end portion 470 of fourth segment 460. Moreover, for reasons provided hereinbelow, each of second holes 200 is coaxially aligned with respective ones of first holes 250 for defining a predetermined distance between the centers thereof.

Referring yet again to FIGS. 6 and 7, instrumentation tube 140 also comprises a generally cylindrical member, such as second sleeve 510, having the previously mentioned inside surface 280 longitudinally therethrough.

Inside surface 280 surrounds distal end portion 470 of fourth segment 460 and proximal end portion 430 of third segment 410 for locking distal end portion 470 of fourth segment 460 to proximal end portion 430 of third segment 460. In this regard, the plurality of outwardly extending first projections 290 are integrally attached to inside surface 280 of second sleeve 510 for engaging respective ones of second holes 200 in distal end portion 470 of fourth segment 460. Moreover, the plurality of outwardly extending second projections 300 are integrally attached to inside surface 280 of second sleeve 510 for engaging respective ones of first holes 250 in proximal end portion 430 of third segment 460. Second sleeve 510 is thin-walled and ductile so that second sleeve 510 will deform when crimped or swaged onto the threaded joint defined by distal end portion 470 of fourth segment 150 and proximal end portion 430 of third segment 460. Thus, it will be appreciated from the above recited description that second sleeve 510 is substantially identical to first sleeve 270, except that second sleeve 510 surrounds the threaded ends of third segment 410 and fourth segment 460, while first sleeve 270 surrounds the threaded ends of first segment 150 and second segment 220.

As best seen in FIGS. 7, second sleeve 510 preferably has an axial length that is longer than the predetermined distance between the centers of first holes 200 and second holes 250, which are respectively formed in third segment 410 and fourth segment 460. Moreover, the predetermined distance between the centers of first holes 200 and second holes 250 is such that first holes 200 and second holes 250 are each partially exposed at each end of second sleeve 510, so that the operator may visually precisely determine where the swaging deformation of second sleeve 510 should occur. After swaging, the projections 290/300 will have deformed approximately along the dotted lines illustrated in FIG. 7 to engage their associated rear walls 210/260.

Figure 8:
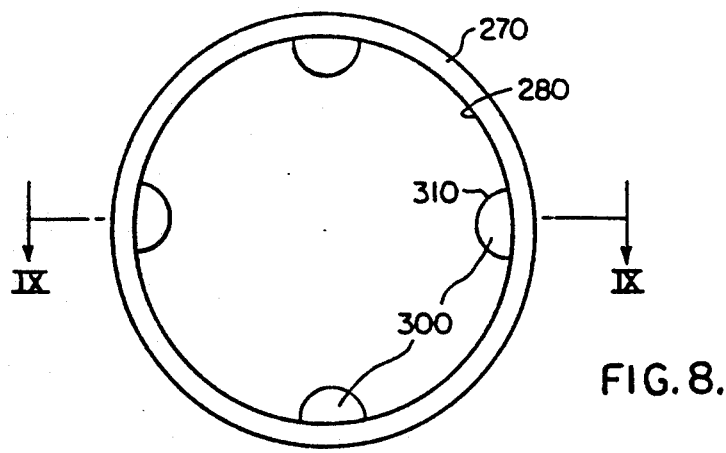
FIG. 8 is a plan view of the sleeve.
Figure 9:
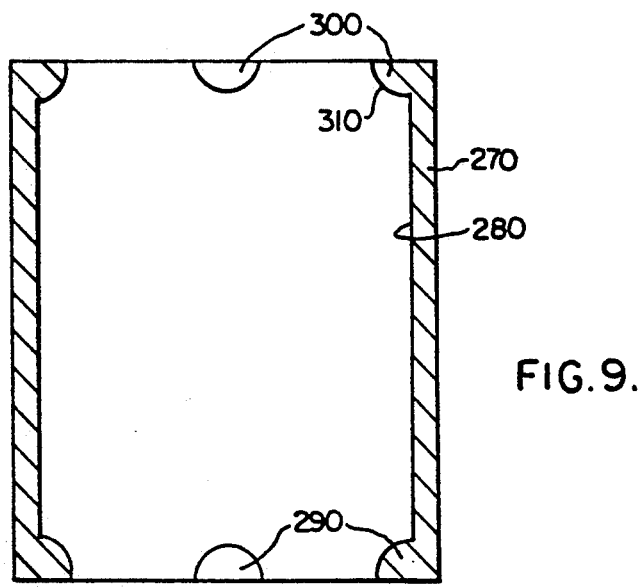
FIG. 9 is a view along section line IX—IX of FIG. 8.

Turning now to FIGS. 8 and 9, the preferred embodiment of first and second sleeves 270/510 is shown having the plurality of first projections 290 and the plurality of second projections 300 integrally attached to inside surface 280 for respectively engaging first holes 200 and second holes 250.

Figure 10:
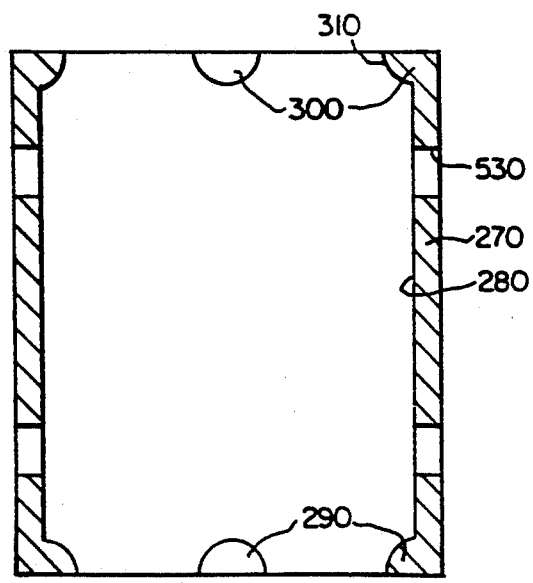
FIG. 10 is a view in vertical section of an alternative embodiment of the sleeve.

Turning briefly to FIG. 10, an alternative embodiment of first and second sleeves 270/510, generally referred to as removable sleeve 520, is shown having a plurality of holes 530 transversely in the wall thereof. During routine reactor operation, the segments and sleeves become radioactive; therefore, holes 530 enable remote removal of sleeve 520. That is, the holes 530 are capable of being engaged by a suitable remotely operated tool (not shown) for removing sleeve 520. After holes 530 are engaged by the remotely operated tool, removable sleeve 520 can be removed by pulling axially on sleeve 520 after disassembly of the threaded joint by untorquing the threaded joint. It will be understood that holes 530 are formed in sleeve 520 at axial locations above and below the threaded joint for pulling sleeve 530 from either segment.

OPERATION

Segmented instrumentation tube 140 is assembled by threadably engaging the internal threads 175 of first segment 150 with the external threads 235 of second segment 220 for connecting first segment 150 to second segment 220. A suitable torque is applied to the segments for forming a sufficiently tight threaded joint. First sleeve 270 is coaxially aligned with segments 150/220 and slid along either first segment 150 or second segment 220 until first sleeve 270 overlaps the threaded joint defined by distal end portion 170 of first segment 150 and proximal end portion 230 of second of second segment 220 such that projections 290/300 are aligned with holes 200/250. A suitable crimping or swaging tool (not shown), such as a vice-like C-clamp or pliers, is then used to apply a predetermined pressing force against the outside surface 190 of first sleeve 270 at the locations of first projections 290 and second projections 300. As the swaging force is applied, the beveled surfaces belonging to first projections 290 and second projections 300 will deformably move inwardly into holes 200/250 to engage their respective rear walls 210 and 260 (see the dotted lines in FIGS. 7). Suitable engagement of first projections 290 and second projections 300 with their respective rear walls 210 and 260 assures that first sleeve 270 will not rotate about the circumference of the threaded joint because first and second projections 290/300 will intimately engage their respective holes 200/250. In this manner, first sleeve 270 prevents independent rotating of first segment 150 with respect to second segment 220.

Moreover, first sleeve 270 has a length that is equal to the sum of the predetermined distance defined between the centers of first holes 200 and second holes 250 plus approximately one-half the diameter of the holes. That is, if each hole has a diameter "d" and if the predetermined axial distance between the centers of the plurality of circumferentially aligned first holes 200 and the plurality of circumferentially aligned second holes 250 is "H", then the length "L" of first sleeve 270 is predetermined by the following equation:

$$L = H + (d/2).$$

It will be understood from the description hereinabove that when first sleeve 270 is assembled onto first segment 150 and second segment 220 in the manner described, a portion of each of first holes 200 and second holes 250 is visible to the operator. This is important because visibility of a portion of each of the holes 200/250 allows the operator to visually precisely determine where the swaging of first sleeve 270 is to occur (i.e., at the axial locations of first projections 290 and second projections 300). Moreover, as disclosed hereinabove, the internal threads 440 of third segment 410 are caused to threadably engage the external threads 480 of fourth segment 460 for suitably connecting third segment 410 to fourth segment 460. Second sleeve 510 will then be assembled about the threaded joint associated therewith in substantially the same manner as first sleeve 270 will be assembled about its associated threaded joint.

Removable sleeve 520, which is the alternative embodiment of sleeves 270/510, is used in substantially the same manner as sleeves 270/510, except that removable sleeve 520 has holes 530 therein engageable by a suitable remotely operable tool for pulling removable sleeve 520 axially away from the threaded joint surrounded by it. In this regard, the threaded joint is forcibly unthreaded to the extent possible and then removable sleeve 520 is axially pulled using the tool. As removable sleeve 520 is axially pulled, first projections 290 and second projections 300 will disengage their respective rear walls and holes. This is so because removable sleeve 520 is made of ductile material which is axially and radially deformable when subjected to a sufficient pulling force.

It will be readily appreciated that post 320 is interposed between upper support plate 90 and upper core plate 100 for supporting upper support 90 and for connecting upper support plate 90 to upper core plate 100. In this regard, post 320 is coaxially aligned with respect to aperture 135, so that flange 340 intimately abuts bottom surface 110 of upper support plate 90 and so that feet 360 rest on top surface 120 of upper core plate 100. Fasteners 380 are caused to pass through bores 370 and holes 390, whereupon nut 400 is threaded onto the threaded end of each fastener 380 for fastening feet 360 and thus post 320 to upper core plate 100.

Although the invention is fully illustrated and described herein, it is not intended that the invention as illustrated and described by limited to the details shown, because various modifications may be obtained with respect to the invention without departing from the spirit of the invention or the scope of equivalents thereof. For example, the sleeves described hereinabove may be welded about their associated threaded joints in addition to being swaged. Although this construction is not preferred, the weldments will provide additional assurance that the threaded joints will not unthread when subjected to normal and off-normal vibrations during reactor operation.

Therefore, what is provided is a segmented instrumentation tube including a locking sleeve for interlocking the segments of the instrumentation tube, so that the threaded ends of the instrumentation tube do not unthread when subjected to vibration.

What is claimed is:

1. A segmented instrumentation tube for use in a reactor vessel, comprising:
   (a) a first member having a proximal end portion and a distal end portion, said first member having an outside surface having a plurality of spaced-apart first holes therein of a predetermined width surrounding the distal end portion of said first member, each of the first holes having a center;
   (b) a second member having a proximal end portion and a distal end portion, said second member having an outside surface having a plurality of spaced-apart second holes therein of a predetermined width surrounding the distal end portion of said second member, the proximal end portion of said second member connected to the distal end portion of said first member, each of the second holes having a center, each of the second holes being associated with respective ones of the first holes for defining a predetermined distance between the centers thereof;
   (c) a cylindrical member having an inside surface surrounding the distal end portion of said first member and the proximal end portion of said second member;
   (d) a plurality of first projections attached to the inside surface of said cylindrical member for engaging respective ones of the first holes in the distal end portion of said first member; and
   (e) a plurality of second projections attached to the inside surface of said cylindrical member for engaging respective ones of the second holes in the proximal end portion of said second member.

2. The segmented instrumentation tube of claim 1, wherein said cylindrical member has a predetermined length approximately equal to the sum of the distance between respective ones of the first holes and the second holes plus one-half the width of the holes.

3. The segmented instrumentation tube of claim 2, wherein each of said first projections and each of said second projections is of a predetermines contour for engaging the first holes and the second holes, respectively.

4. The segmented instrumentation tube of claim 3, wherein said cylindrical member has a plurality of transverse holes therethrough for removing said cylindrical member.

5. A segmented instrumentation tube for us in a reactor vessel, comprising;
   (a) an elongate first member having a threaded distal end portion and a proximal end portion, said first member having an outside surface having a plurality of spaced-apart blind first holes therein defining a rear wall in each of the first holes, each of the first holes being of a predetermined width and aligned around the distal end portion of said first member, each of the first holes having a center;
   (b) an elongate second member having a distal end portion and a threaded proximal end portion, said second member having an outside surface having a plurality of spaced-apart blind second holes therein defining a rear wall in each of the second holes, the second holes being of a predetermined width and aligned around the proximal end portion of said second member, the proximal end portion of said second member threadably engaging the distal end portion of said first member for defining a threaded joint therebetween, each of the second holes having a center, each of the second holes being associated with respective ones of the first holes for defining a predetermined distance between the centers thereof;
   (c) a cylindrical member having an inside surface surrounding the distal end portion of said first member and the proximal end portion of said second member for locking the distal end portion of said first member to the proximal end portion of said second member;
   (d) a plurality of outwardly extending first projections integrally attached to the inside surface of said cylindrical member for engaging respective ones of the first holes in the distal end portion of said first member; and
   (e) a plurality of outwardly extending second projections integrally attached to the inside surface of said cylindrical member for engaging respective ones of the second holes in the proximal end portion of said second member.

6. The segmented instrumentation tube of claim 5, wherein said cylindrical member has a predetermined length approximately equal to the sum of the distance between respective ones of the first holes and the second holes plus one-half the width of the holes, so that a portion of each of the first holes and the second holes is visible as said cylindrical member surrounds the distal end portion of said first member and the proximal end portion of said second member.

7. The segmented instrumentation tube of claim 6, wherein each of said first projections and each of said second projections has a predetermined beveled surface facing its respective rear wall for engaging the rear wall.

8. The segmented instrumentation tube of claim 7, wherein said cylindrical member has a plurality of transverse holes therethrough engageable by a removal tool for removing said cylindrical member.

9. In a vertically-oriented reactor vessel having a horizontally-oriented upper support plate disposed in the vessel and a horizontally-oriented upper core plate spaced below the upper support plate, the upper support plate and the upper core plate each having a plurality of apertures therethrough, the upper support plate having a bottom surface and the upper core plate having a top surface and a plurality of holes therethrough, a segmented instrumentation tube for providing an unobstructed guideway for an instrument probe, comprising:

(a) an elongate generally tubular first segment having an externally threaded distal end portion and a proximal end portion sized to be received in a respective one of the apertures of the upper support plate, said first segment having an outside surface having a plurality of spaced-apart circular blind first holes defining a rear wall in each of the first holes, each of the first holes having a center, each of the first holes being of a predetermined diameter and aligned around the distal end portion of said first segment;

(b) an elongate generally tubular second segment coaxially aligned with said first member and having a distal end portion and an internally threaded proximal end portion, the internal threads of the proximal end portion of said second segment threadably engaging the external threads of the distal end portion of said first segment for defining a threaded joint therebetween, said second segment having an outside surface having a plurality of spaced-apart circular blind second holes defining a rear wall in each of the second holes, each of the second holes having a center, each of the second holes being of a predetermined diameter and aligned around the distal end portion of said second segment, each of the first holes and the second holes being aligned with respective ones of the first holes for defining a predetermined distance between the centers thereof;

(c) a generally cylindrical first sleeve having an inside surface longitudinally therethrough surrounding the distal end portion of said first segment and the proximal end portion of said second segment for locking the distal end portion of said first segment to the proximal end portion of said second segment;

(d) a plurality of outwardly extending first projections integrally attached to the inside surface of said first sleeve for engaging respective ones of the first holes in the distal end portion of said first segment; and (e) a plurality of outwardly extending second projections integrally attached to the inside surface of said first sleeve for engaging respective ones of the second holes in the proximal end portion of said second segment.

10. The segmented instrumentation tube of claim 9, wherein said first sleeve has a predetermined length approximately equal to the sum of the distance between respective ones of the first holes and the second holes plus one-half the width of the holes so that a portion of each of the first holes and the second holes is visible as said first sleeve surrounds the distal end portion of said first segment and the proximal end portion of said second segment.

11. The segmented instrumentation tube of claim 10, wherein each of said first projections and each of said second projections has a beveled surface facing its respective rear wall for engaging the rear wall, whereby said first sleeve prevents unthreading of the threaded joint as said first projections and said second projections engage the rear wall of respective ones of the first holes and the second holes.

12. The segmented instrumentation tube of claim 11, further comprising a generally tubular post coaxially aligned with said second segment, said post having a first end portion having a flange for engaging the bottom surface of the upper support plate to support the upper support plate, the distal end portion of said first segment being mounted on the first end portion of said post so that said first segment is supported thereby, said post having a second end portion having a plurality of outwardly extending feet depending therefrom for resting said post on the top surface of the upper core plate, each of the feet having a bore therethrough for receiving a fastener capable of engaging a respective one of a plurality of holes in the upper core plate for fastening said post to the upper core plate.

13. The segmented instrumentation tube of claim 12, further comprising:

(a) an elongate generally tubular third segment, said third segment having a proximal end portion having the distal end portion of said second segment mounted thereon and having an internally threaded proximal end portion, said third segment having an outside surface having a plurality of spaced-apart circular blind first holes defining a rear wall in each of the first holes, each of the first holes having a center, each of the first holes being of a predetermined diameter and aligned around the proximal end portion of said third segment;

(b) a generally tubular fourth segment coaxially aligned with said third segment, said fourth segment having a externally threaded distal end portion threadably engaging the internal threads of the proximal end portion of said third segment for defining a threaded joint therebetween and having a proximal end portion, said fourth segment having an outside surface having a plurality of spaced-apart circular blind second holes defining a rear wall in each of the second holes, each of the second holes having a center, each of the second holes being of a predetermined diameter and aligned around the proximal end portion of said fourth segment, each of the second holes being aligned with respective ones of the first holes for defining a predetermined distance between the centers thereof;

(c) a generally cylindrical second sleeve having an inside surface longitudinally therethrough surrounding the proximal end portion of said third segment and the distal end portion of said fourth segment for locking the distal end portion of aid third segment to the distal end portion of said fourth segment;

(d) a plurality of outwardly extending first projections integrally attached to the inside surface of said second sleeve for engaging respective ones of the first holes in the proximal end portion of said third segment; and (e) a plurality of outwardly extending second projections integrally attached to the inside surface of said second sleeve for engaging respective ones of the second holes in the distal end portion of said fourth segment.

14. The segmented instrumentation tube of claim 13, wherein said second sleeve has a predetermined length approximately equal to the sum of the distance between respective ones of the first holes and the second holes plus one-half the width of the holes to that a portion of each of the first holes and the second holes in visible as said second sleeve surrounds the proximal end portion of said third segment and the distal end portion of said fourth segment.

15. The segmented instrumentation tube of claim 14, wherein each of said first projections and each of said second projections has a beveled surface facing its respective rear wall for engaging the rear wall, whereby said second sleeve prevents unthreading of the threaded joint defined by said third segment and said fourth segment as said first projections and said second projections engage the rear wall of respective ones of the first holes and the second holes.

16. The segmented instrumentation tube of claim 15, wherein said first sleeve and said second sleeve each has a plurality of transverse holes therethrough engageable by a removal tool for removing said first sleeve and said second sleeve.

* * * * *